US006470325B1

(12) United States Patent
Leemhuis

(10) Patent No.: US 6,470,325 B1
(45) Date of Patent: Oct. 22, 2002

(54) METHOD AND DATA PROCESSING SYSTEM FOR MANAGING A MUTUAL FUND BROKERAGE

(76) Inventor: Adrian S. Leemhuis, 15 Maitland Place, Apt. 409, Toronto, Ontario (CA), M4Y 2X3

( * ) Notice: Subject to any disclaimer, the term of this patent is extended or adjusted under 35 U.S.C. 154(b) by 0 days.

(21) Appl. No.: 09/336,225

(22) Filed: Jun. 18, 1999

(51) Int. Cl.$^7$ .............................................. G06F 17/60
(52) U.S. Cl. .............................. 705/36; 705/35; 705/42
(58) Field of Search ............................... 705/36, 35, 42

(56) References Cited

U.S. PATENT DOCUMENTS

| | | | | |
|---|---|---|---|---|
| 5,126,936 A | * | 6/1992 | Champion et al. | 364/408 |
| 5,262,942 A | * | 11/1993 | Earle | 364/408 |
| 5,517,406 A | * | 5/1996 | Harris et al. | 364/408 |
| 5,694,549 A | * | 12/1997 | Carlin et al. | 395/200.2 |
| 5,757,917 A | * | 5/1998 | Rose et al. | 380/25 |
| 5,775,734 A | * | 7/1998 | George, Jr. | 283/57 |
| 6,041,313 A | * | 3/2000 | Gilbert et al. | 705/36 |
| 6,188,993 B1 | * | 2/2001 | Eng et al. | 705/37 |
| 6,260,024 B1 | * | 7/2001 | Shkedy | 705/37 |

OTHER PUBLICATIONS

"Trailer Rebates" http://www.bylo.org/trailreb.html.*
Dictionary of Finance and Investment Terms: 5th Ed. Barron's Educational Series, Copyright 1998.*
Issues in Mutual Fund Legistlation & Regulation Communications Topics: http://www.ici.org/issues/sec_fee_calc.html.*
Issues in Mutual Fund Legistlatin & Regulation Communications Topics: http://www.ici.org/issues/sec_fee_disc.html.*
Mutual Funds: A guide for beginning investors: wysiwyg://2104/http:mosl.sos.state.mo.us/sos-sec/mufunds.html.*
asldirect.com: wysiwyg://133/http://www.asldirect.com/.*
Excerpts from "Regulatory Strategies for Mid 90's–Recommendations For Regulating Investment Funds in Canada" prepared by Glorianne Stromberg for the Canadian Securities Administrators, Jan. 1995.*
Chevreau, J., "Canada Trust Drops Fund Commissions"; Financial Post; (Apr. 8, 1998), p. 30.*
Chevreau, J., "Trailer–fee Rebate Could Lead to Lower Fund MERs"; Financial Post; (Mar. 28, 1998), p. 34.*

* cited by examiner

*Primary Examiner*—Vincent Millin
*Assistant Examiner*—Daniel S Felten
(74) *Attorney, Agent, or Firm*—Mark Kusner; Michael A. Jaffe

(57) ABSTRACT

The invention provides a method of managing a mutual fund brokerage wherein subscribers, intending to purchase mutual fund portions in at least one mutual fund, enter into a service contract with the mutual fund brokerage. Each subscriber pays to the brokerage a subscription charge and the brokerage maintains a separate portfolio of mutual fund portions for each subscriber and a separate subscriber account balance including payments of subscription charges received from each subscriber. The brokerage executes a number of mutual fund portion purchase/sell transactions on behalf of a trading subscriber with a target mutual fund selected by the trading subscriber. The improvement relates to not charging front-end or back-end loaded commissions, together with the rebating of trailer fees from no-load funds where all service fees received by the brokerage from each paying mutual fund are apportioned pro rata for each portion of said paying mutual fund in each subscribers portfolio. The purchaser can also participate in deciding the manner in which savings in brokerage fees can be handled to their maximum benefit and/or convenience. In this way, the subscriber pays a predictable charge to the brokerage and receives a higher return on investment than under conventional methods where significant amounts of service fees are retained by the brokerage. In the past, where brokerage operations depended on personal service and advice to purchasers, high brokerage fees and commissions could be justified somewhat. However, many current mutual fund purchasers research mutual fund performance over the internet themselves and merely place orders by computer with discount brokerages. The service fees paid to brokerages result in a significant reduction in the purchaser's return from a mutual fund. investment which is unwarranted in many circumstances.

10 Claims, No Drawings

METHOD AND DATA PROCESSING SYSTEM FOR MANAGING A MUTUAL FUND BROKERAGE

TECHNICAL FIELD

The invention is directed to a method for managing a mutual fund discount brokerage and. accompanying data processing system, wherein: subscribers subscribe to a fixed cost brokerage service contract for a time period determined by the subscriber; subscribers receive a rebate of broker service fees paid periodically by the mutual fund to the brokerage; and in a preferred embodiment subscribers receive unlimited internet access including access to a brokerage site wherein purchaser mutual fund portfolio data can be accessed and buy/sell trading orders can be implemented.

BACKGROUND OF THE ART

Mutual fund units and shares are purchased through a broker or directly from the mutual fund. The mutual fund and purchaser decide for themselves whether they wish to deal through brokers or deal directly without a broker. In this description, the term "portions" will be used to refer to all shares or units in a mutual fund, as those terms are defined by established practice with. For the purposes of the invention, whether a mutual fund is structured to distribute shares or units is irrelevant since the method is applied to each type of holding in the same way.

One means of providing brokers with compensation involves a mutual fund selling scheme known as "front end loaded" where the broker is given a commission based on a percentage of the total price of portions purchased. For example, if a purchaser wishes to purchase 100 portions of $10 value each, the up-front purchase price paid is $1050 of which $1000 is invested in the mutual fund and $50 commission or 5% service fee goes to the broker.

Another compensation scheme is known as "back end loaded" or "deferred sales charge". Deferred sales operate in a manner which effectively hides the compensation to the mutual fund broker from the purchaser. Following the same example, the up-front price paid by the purchaser for the same purchase (100 portions at $10 each) is $1000. However, the broker is paid a service fee of $50 or 5% immediately by the mutual fund. To pay the broker, the mutual fund must borrow the $50 and mutual funds initially operate at a deficit for this reason until they become well established. Of course there are various provisions to penalize purchasers if they wish to sell their portions before a period after the initial sale to recoup the broker service fee, mutual fund management expenses and discourage migration of capital. For example, a penalty of 6% may be charged for sales of mutual fund portions in the first year after purchase, 5% the second year, 4% the third year and so on. The purchaser does not readily perceive the cost of the broker service fees but due to the severely reduced liquidity of their mutual fund investment and monetary penalties, this cost is incurred never-the-less.

So-called discount brokers operate on the basis of no commission or "no load". Such brokers are compensated for their efforts by the mutual fund with "trailer fees".

In the management of a mutual fund, the managers incur fixed and variable expenses which are charged to the holders of mutual fund portions on a pro rata basis. The "management expense ratio" (MER) is set by the mutual fund and in theory is calculated by dividing total mutual fund management expenses by the total amount of funds managed. In practice, a mutual fund sets the MER arbitrarily, the MER is approved by the mutual fund unit or share holders and usually the MER does not change over time. The MER is published and is included in a prospectus given to prospective purchasers.

The trailer fees are a portion of the MER and are trailer fees are paid regularly to the selling brokers for as long as the holders of mutual fund portions retain their shares or units as the case may be. For example, if the MER is 3%, management expenses of $3 are charged for each $100 of portions resulting in a value to the holder of portion of $97. Hopefully the management of the mutual fund has increased the value of the portions a sufficient amount over the originally invested $100 to more than cover this expense to the portion holders. Of the %3 MER, the trailer fees paid to brokers may account for %1 and the remaining %2 is retained by the mutual fund management for payment of salaries, bonuses, rental of office space and other such expenses.

Trailer fees are paid monthly or quarterly to brokers for as long as the mutual fund portions remain in the hands of the purchaser who dealt through that broker. In theory, the trailer fees compensate the broker for their continued advice and counsel to the purchaser while the purchaser holds the mutual fund portions. However, a conflict of interest between the interest of the portion holder and the broker is obvious. The likelihood of obtaining independent advice from the broker is somewhat suspect since the broker has a direct interest in directing clients towards the mutual funds that provide the highest trailer fees, and the broker has a strong incentive to advise clients to retain shares or units rather than to sell and reinvest.

In practice, many times the purchaser does not consult the broker except when a sale or purchase of portions is desired. The broker serves mostly to facilitate the sale on a retail level. The purchaser can review the performance of the mutual fund through a printed statement published by the mutual fund, or independently over the internet and determine whether they wish to retain the portions (shares or units as the case may be), sell portions or buy more portions without consulting the broker. Especially in the case of discount brokers operating impersonally over the Internet to trade shares/units for purchasers they have never met, but also when dealing via telephone or in a walk-in retail branch of the mutual fund broker, the justification no longer exists for continuing trailer fees that are charged as part of the MER as an ongoing management function.

BRIEF SUMMARY OF THE INVENTION

In accordance with one aspect of the present invention, there is provided a method of managing a mutual fund brokerage wherein subscribers, intending to purchase mutual fund portions in at least one mutual fund, enter into a service contract with the mutual fund brokerage for a predetermined duration. Each subscriber pays to the brokerage a fixed predetermined subscription charge. The brokerage maintains a separate portfolio of mutual fund portions for each subscriber and a separate subscriber's account balance including payments of the subscription charges received from each subscriber. The brokerage executes a number of mutual fund portion purchase/sell transactions on behalf of a trading subscriber with a target mutual fund selected by the trading subscriber. Importantly, one hundred percent of all service fees that are received by the brokerage in respect of each individual subscriber's mutual fund portions from each paying mutual fund are deposited in full in each said individual subscriber's account balance apportioned pro rata for each portion of said paying mutual fund in each said individual subscriber's portfolio.

In accordance with another aspect of the present invention, there is provided, a data processing system for managing a mutual fund brokerage wherein subscribers, intending to purchase mutual fund portions in at least one mutual fund, enter into a service contract with the mutual fund brokerage to maintain a portion portfolio. The data processing system includes: (1) computer processing means for processing data; and (2) electronic storage means for storing and retrieving portfolio and subscriber account data on a storage medium for each subscriber. The portfolio data includes: the number of portions owned in a mutual fund; the current portion price of each portion owned; and the aggregate total value of portions in the portfolio. The account data includes: an account balance; the duration of the service agreement; and subscriber identification data. The data processing system also includes: (3) initialisation means for initialising portfolio and account data on said storage medium; (4) subscriber communication means for electronically communicating subscriber trading transaction instructions to the computer processing means, and for displaying portfolio and account data to the subscriber; (5) brokerage communication means for electronically communicating mutual fund trading transaction data between the computer processing means and a mutual fund computer; (6) trade calculation means for calculating, modifying and storing adjusted portfolio data as a result of said trading transaction instructions and transaction data; and (7) service fee rebate calculation means for calculating, modifying and storing adjusted account data wherein one hundred percent of all service fees that are received by the brokerage in respect of each individual subscriber's mutual fund portions from each paying mutual fund are deposited in full in each said individual subscriber's account balance apportioned pro rata for each portion of said paying mutual fund in each said individual subscriber's portfolio.

It is an object of the present invention to provide a method of managing a mutual fund brokerage where the owners of the mutual fund portions receive a higher return on their investment through rebating of all trailer fees from no-load funds and by not charging broker commissions on front end loaded, or deferred/back-end loaded funds.

It is an object of the present invention to provide a method of managing a mutual fund brokerage where the all expense involved in dealing with a broker is fully disclosed, predictable and in the control of the holder of mutual fund shares or units.

It is an object of the present invention to provide a method of managing a mutual fund brokerage where the brokerage has absolutely no conflict of interest, can freely represent the interests of holders of mutual fund portions and does not participate in nor benefit from the hidden cost of trailer fees buried within the MER of a conventional mutual fund. An object is to produce an open mutual fund market with full and rapid disclosure of mutual fund costs and thereby to reduce the MER charged to holders of mutual fund portions.

Further objects of the invention will be apparent from review of the disclosure and description of the invention below.

DISCLOSURE OF THE INVENTION

The invention provides a method of managing a mutual fund brokerage wherein subscribers, intending to purchase mutual fund portions in at least one mutual fund, enter into a service contract with the mutual fund brokerage for a duration.

Each subscriber pays to the brokerage a subscription charge and the brokerage maintains a separate portfolio of mutual fund portions for each subscriber and a separate subscriber account balance including payments of subscription charges received from each subscriber. The brokerage executes a number of mutual fund portion purchase/sell transactions on behalf of a trading subscriber with the target mutual fund selected by the trading subscriber.

The improvement relates to the rebating of service fees where all service fees received by the brokerage from each paying mutual fund are apportioned pro rata for each portion of said paying mutual fund in each subscribers portfolio. In this way, the subscriber pays a predictable charge to the brokerage and receives a higher return on investment than under conventional methods where significant amounts of service fees are retained by the brokerage.

In the past, where brokerage operations depended on personal service and advice to purchasers, high brokerage fees and commissions could be justified somewhat. However, most current mutual fund purchasers are very sophisticated, research mutual fund performance over the internet themselves and merely place orders by computer with discount brokerages. The high fees paid to brokerages result in a direct significant unwarranted reduction in the purchaser's return from a mutual fund investment.

The invention further provides a data processing system for managing a mutual fund brokerage wherein subscribers, intending to purchase mutual fund portions in at least one mutual fund, enter into a service contract with the mutual fund brokerage to maintain a portion portfolio for a duration. The data processing system includes computer processing means for processing data, and electronic storage means for storing and retrieving portfolio and subscriber account data on a storage medium for each subscriber.

The portfolio data includes the number of portions owned in a mutual fund; the current portion price of each portion owned and the aggregate total value of portions in the portfolio. Account data includes an account balance; rebate preference of the client, subscriber identification data, and other relevant information or data as seen fit to suit changing requirements. The rebate of brokerage service fees received from the mutual funds can be directed as chosen by the subscriber through a number of options. A rebate may be processed as a credit to the subscriber's account, a credit card credit, a deposit to a client's trust account or bank account, etc. Initialisation of portfolio and account data on the storage medium precedes full account activity during trading in mutual fund portions by the brokerage.

Subscribers communicate electronically with an internet web site of the brokerage to obtain reports of current portfolio data and to communicate subscriber trading transaction instructions to the brokerage computer. The brokerage communicates electronically with the mutual fund to conduct trades on behalf of subscribers.

The brokerage computer system serves for calculating, modifying and storing adjusted portfolio data as a result of trading transactions. The brokerage fee rebate is carried out whenever mutual funds pay service fees to the brokerage by the brokerage computer which serves for calculating, modifying and storing adjusted account data. Service fees received by the brokerage from each paying mutual fund are apportioned pro rata to each subscriber's account balance for each portion of the paying mutual fund in each subscriber's portfolio.

Therefore, it is conceivable that if a subscriber owns a sufficient number of portions in a mutual fund portfolio, the subscriber may receive a rebate of service fees equal to or greater than the entire cost of the brokerage service contract. The brokerage working on the basis of trading via internet access can solicit subscriptions world-wide and develop a profitable business based on large numbers of subscribers each paying a nominal fixed subscription charge or a variable charge depending on the activity of their portfolio.

Further details of the invention and its advantages will be apparent from the detailed description below.

DETAILED DESCRIPTION OF PREFERRED EMBODIMENTS

The invention is a method of carrying on business providing a method of managing a mutual fund brokerage wherein subscribers, intending to purchase mutual fund portions in at least one mutual fund, enter into a service contract with the mutual fund brokerage for a duration for a predetermined price.

Since the subscribers deal with the brokerage through internet access to the brokerage web site, a preferred optional feature of the method includes a provision in the service contract such that the brokerage act as an Internet service provider to each subscriber. The cost of internet access is therefore included in the mutual fund brokerage service contract at a predetermined price and preferably the service contract provides unlimited internet access to each subscriber. The cost of these two essential investor services are combined and rendered predictable.

The subscriber can monitor the performance of their total portfolio, monitor the performance of individual mutual funds, check their account balance with the brokerage, buy and sell portions with the brokerage, research mutual funds and obtain financial data, all through accessing the brokerage web site. Therefore there is a substantial synergy in the provision of services for a fixed cost which include unlimited internet access with interactive brokerage services.

Each subscriber pays to the brokerage a subscription charge, which in all cases is predetermined by the terms of the service contract and does not depend on the mutual fund management expenses or fund performance. The subscription charge can take the form of a lump sum amount (for example: $40 per month with unlimited number of trades), a variable amount dependant on the number of mutual fund portion purchase/sell transactions executed for a subscriber, or a lump sum minimum plus a variable amount dependant on the number of mutual fund portion purchase/sell transactions executed for a subscriber over a threshold number of transactions.

The duration of the service contract can be for an unlimited period of time subject to termination by the subscriber and the brokerage, or an initial fixed period followed by an unlimited period of time subject to termination by the subscriber and the brokerage.

The brokerage maintains a separate portfolio of mutual fund portions for each subscriber and a separate subscriber account balance including payments of subscription charges received from each subscriber.

The brokerage then executes a number of mutual fund portion purchase/sell transactions on behalf of a trading subscriber with a target mutual fund selected by the trading subscriber through access to the brokerage web site.

Service fees received by the brokerage from each paying mutual fund are automatically apportioned pro rata for each portion of the paying mutual fund in each subscribers portfolio. The rebate of service fees can be deposited as a credit to the subscriber's account, can be paid out directly to the subscriber, or can be reinvested automatically in purchasing further mutual fund portions.

The method includes rebate of all trailer fees from no-load funds and not charging broker commissions in the manner conventionally known as front end loading, nor in deferred/back-end loading.

In order to carry out the above described method, sophisticated computer systems are required since the economies of scale require a large volume of activity and diverse mutual fund portion holdings. The data processing system for managing the mutual fund brokerage includes computer processing means for processing data such as the CPU of a host server computer and accompanying electronic storage means for storing and retrieving portfolio and subscriber account data on a storage medium for each subscriber.

Portfolio data includes the number of portions owned in a mutual fund, the current portion price of each portion owned, and the aggregate total value of portions in the portfolio, for each subscriber. Subscriber account data includes an account balance, the duration of the service agreement, and subscriber identification data, such as name, contact address, passwords etc.

Initialisation means are required for initialising portfolio and account data on said storage medium, and subscriber communication means for electronically communicating subscriber trading transaction instructions to the computer processing means, and for displaying portfolio and account data to the subscriber. Brokerage communication means for electronically communicating mutual fund trading transaction data between the computer processing means and a mutual fund computer. These components are common to all internet trading systems and need not be described in detail herein since they are known to those skilled in the art.

The brokerage computer system serves to calculate, modify and store adjusted portfolio data as a result of trading transaction instructions from the subscriber and transaction data from the mutual fund.

Brokerage fee rebates are calculated automatically by the brokerage computer and/or the mutual fund computer system serving as calculation means for calculating, modifying and storing adjusted account data wherein service fees received by the brokerage from each paying mutual fund are apportioned pro rata to each subscriber's account balance for each portion of the paying mutual fund in each subscriber's portfolio.

Once a subscriber account is established, the brokerage computer can withdraw subscription fees automatically from the account at a selected time. Also, the brokerage computer can detect any positive balance in the subscriber's account and act as reinvestment means for withdrawing a selected reinvestment amount from a subscriber's account balance at a selected time, for executing a mutual fund portion purchase reinvestment transaction with the reinvestment amount, and for calculating, modifying and storing adjusted portfolio data as a result of said reinvestment transaction.

Although the above description relates to a specific preferred embodiment as presently contemplated by the inventor, it will be understood that the invention in its broad aspect includes functional equivalents of the elements described.

I claim:

1. A method of managing a mutual fund brokerage wherein subscribers, intending to purchase mutual fund portions in at least one mutual fund, enter into a service contract with the mutual fund brokerage for a predetermined duration wherein:

each subscriber pays to the brokerage a fixed predetermined subscription charge;

the brokerage maintains a separate portfolio of mutual fund portions for each subscriber and a separate subscriber's account balance including payments of the subscription charges received from each subscriber;

the brokerage executes a number of mutual fund portion purchase/sell transactions on behalf of a trading subscriber with a target mutual fund selected by the trading subscriber; and one hundred percent of all service fees that are received by the brokerage in respect of each individual subscriber's mutual fund portions from each paying mutual fund are deposited in full in each said individual subscriber's account balance apportioned pro rata for each portion of said paying mutual fund in each said individual subscriber's portfolio.

2. A method of managing a mutual fund brokerage according to claim 1 wherein the subscription charge is selected from the group consisting of: a lump sum amount; a variable amount dependant on the number of mutual fund portion purchase/sell transactions executed for a subscriber; and a lump sum minimum plus a variable amount dependent on the number of mutual fund portion purchase/sell transactions executed for a subscriber over a threshold number of transactions.

3. A method of managing a mutual fund brokerage according to claim 1 wherein the duration of the service contract is selected from the group consisting of: a fixed duration; an unlimited period of time subject to termination by the subscriber and the brokerage; and an initial fixed period followed by an unlimited period of time subject to termination by the subscriber and the brokerage.

4. A method of managing a mutual fund brokerage according to claim 1 wherein the subscriber communicates with the brokerage via internet access with a web site provided by the brokerage.

5. A method of managing a mutual fund brokerage according to claim 4 wherein the service contract provides that the brokerage act as an internet service provider to each subscriber.

6. A method of managing a mutual fund brokerage according to claim 5 wherein the service contract provides unlimited internet access to each subscriber.

7. A method of managing a mutual fund brokerage according to claim 1 wherein the service fees are selected from the group consisting of: sales commissions paid on initial sale of a paying mutual fund portion; deferred sales commissions paid after-expiry of a time period following initial sale of a paying mutual fund portion; and trailer fees paid periodically based on a proportion of the MER of the paying mutual fund.

8. A data processing system for managing a mutual fund brokerage wherein subscribers, intending to purchase mutual fund portions in at least one mutual fund, enter into a service contract with the mutual fund brokerage to maintain a portion portfolio, the data processing system including:

computer processing means for processing data;

electronic storage means for storing and retrieving portfolio and subscriber account data on a storage medium for each subscriber, said portfolio data including: the number of portions owned in a mutual fund; the current portion price of each portion owned; and the aggregate total value of portions in the portfolio, said account data including: an account balance; the duration of the service agreement; and subscriber identification data; initialisation means for initialising portfolio and account data on said storage medium;

subscriber communication means for electronically communicating subscriber trading transaction instructions to the computer processing means, and for displaying portfolio and account data to the subscriber;

brokerage communication means for electronically communicating mutual fund trading transaction data between the computer processing means and a mutual fund computer;

trade calculation means for calculating, modifying and storing adjusted portfolio data as a result of said trading transaction instructions and transaction data; and service fee rebate calculation means for calculating, modifying and storing adjusted account data wherein one hundred percent of all service fees that are received by the brokerage in respect of each individual subscriber's mutual fund portions from each paying mutual fund are deposited in full in each said individual subscriber's account balance apportioned pro rata for each portion of said paying mutual fund in each said individual subscriber's portfolio.

9. A data processing system for managing a mutual fund brokerage according to claim 8 including:

subscription fee withdrawal means for withdrawing a subscription fee from each subscriber's account balance at a selected time.

10. A data processing system for managing a mutual fund brokerage according to claim 8 including:

reinvestment means for withdrawing a reinvestment amount from a subscriber's account balance at a selected time, for executing a mutual fund portion purchase reinvestment transaction with said reinvestment amount, and for calculating, modifying and storing adjusted portfolio data as a result of said reinvestment transaction.

* * * * *